Patented Jan. 13, 1942

2,269,470

UNITED STATES PATENT OFFICE 2,269,470

PROCESS OF TREATING PIGMENTS

Kenneth S. Mowlds, Baltimore, Md., assignor to The Glidden Company, Cleveland, Ohio, a corporation of Ohio No Drawing. Application July 27, 1939, Serial No. 286,808

10 Claims. (Cl. 106—308)

The present invention relates to the treatment of pigments, and particularly relates to the treatment of pigments to improve their hiding power.

In copending application Serial No. 175,246, filed November 18, 1938, there is disclosed the treatment of a base pigment with soluble silicates followed by a precipitation of the silicate in insoluble form by means of precipitating salts and acids. Among the salts which may be used is aluminum sulfate. However, certain difficulties are encountered in the use of aluminum sulfate, and as the pigment produced by using aluminum sulfate has certain advantages over those produced by the use of other precipitating salts it is very desirable that aluminum sulfate be used.

According to the present invention a process is provided whereby the process of treating pigment with soluble silicates followed by precipitation with aluminum sulfate is improved.

In effecting the precipitation of soluble silicates such as sodium silicate, with calcium or other alkaline earth salts, the amount of precipitating salt required for complete precipitation and coagulation of the sodium silicate is equivalent to the $Na_2O$ content of the soluble silicate. The soluble silicate does react as such, but the reaction with precipitating salts appears to be with the $Na_2O$ of the soluble silicate and in the case of calcium and similar salts precipitation is complete when the amount of salt is sufficient to supply enough acid to satisfy the hydroxyl ions provided by the $Na_2O$ of the soluble silicate. Also the precipitate formed coagulates and is readily filtered.

In effecting the precipitation of the soluble silicate, such as sodium silicate for example, with an amount of $Al_2(SO_4)_3$ sufficient to supply enough acid to satisfy the hydroxyl ions attributable to the $Na_2O$ in the silicate, if the ratio of $Na_2O$ to $SiO_2$ is approximately 1:1, the material will precipitate and is fairly easy to handle on filtration etc. However, it is not as easy to handle as when other precipitation salts such as $CaCl_2$, are used. This is believed to be due to the amphoteric nature of the $Al_2(SO_4)_3$. As the ratio of $Na_2O$ to $SiO_2$ decreases, the difficulty of precipitating and handling increases with decreasing $Na_2O$ content, until at an $Na_2O:SiO_2$ ratio of 1:3 or less precipitation will not occur when using an amount of $Al_2(SO_4)_3$ just sufficient to supply enough acid to satisfy the hydroxyl ions attributable to the $Na_2O$ content.

It has been found, however, that if an excess over that amount of $Al_2(SO_4)_3$ is added to effect precipitation, the precipitation is improved. Preferably the amount of $Al_2(SO_4)_3$ added is about 3 times that required to supply sufficient acid to satisfy hydroxyl ions attributable to the $Na_2O$ content. This amount, however, can be varied and will depend somewhat upon the $Na_2O$ content of the silicate. The treatment is most needed when the ratio of $Na_2O$ to $SiO_2$ is less than 5:7 but advantageous results are obtained by treating silicates in which the ratio is 1:1. By using three times the molecular equivalent of $Al_2(SO_4)_3$, a sodium silicate having $Na_2O$ to $SiO_2$ ratio 1:3 or less can be precipitated.

The difficulty of filtering and handling the product when using $Al_2(SO_4)_3$ alone to effect precipitation is present regardless of how this precipitation is brought about. Consequently while precipitation can be effected in the manner indicated and can be employed in the production of a satisfactory pigment of increased hiding power it is desirable that a precipitate be produced which is easier to filter and handle. This difficulty in filtering and handling is greater in those precipitates formed from soluble silicates having lower $Na_2O:SiO_2$ ratios than in those having higher ratios.

Since an excess of aluminum sulfate has been used the precipitate is acid, and it has been found that the difficulty of filtering and handling the precipitated aluminum silicate can be overcome by the addition of a small amount of an electrolyte such as alkaline earth metal or zinc oxide, hydroxide or salt, alkali metal oxides and hydroxides such as $ZnSO_4$, $BaOH$, $CaOH$, $NaOH$, etc. This improvement in the ease of filtering and handling results from coagulation of the precipitate and it will of course be obvious that silicates and insoluble salts such as barium sulfate and calcium carbonate will have little or no coagulating or precipitating action. In those instances in which the amount of $Al_2(SO_4)_3$ is sufficient to substantially completely precipitate the silicate the amount of alkali metal, alkaline earth metal or zinc compound added may be small and when alkalies are used they are preferably sufficient to supply enough hydroxyl ions to satisfy the acidity attributable to any excess aluminum sulfate.

In cases where the amount of $Al_2(SO_4)_3$ is not sufficient to completely precipitate the silicate the amount of the alkaline earth metal or zinc compound should be increased for best results, the amount being increased as the deficiency of $Al_2(SO_4)_3$ necessary to effect precipitation increases. In such cases the effect of the alkaline earth metal or zinc compound appears to be threefold. In the first place some of the silicate will be precipitated as the alkaline earth metal or zinc silicate. However, the effect on the precipitation does not appear to be limited to the precipitation of some of the silicate as the alkaline earth or zinc silicate as the addition of the alkaline earth metal or zinc compound appears to increase the precipitation of aluminum silicate, particularly where there is an excess of the $Al_2(SO_4)_3$ over that required to supply enough acid to satisfy the hydroxyl ions attributable to the alkali content of the soluble silicate. This action is also present when alkali metal alkalies are used. Thirdly, the alkaline earth or zinc compound added improves the ease of filtering and handling the precipitate. Thus a simultaneous precipitation of aluminum silicate and the alkaline earth metal or zinc silicate may be employed, although ordinarily a substantially complete precipitation as aluminum silicate is to be preferred. Thus alkalies such as those of alkaline earth metal and zinc which produce insoluble silicates are preferred.

The following examples are illustrative:

Example I 30,000 grams of lithopone were slurried in water and 780 grams of sodium silicate ($Na_2O:SiO_2$ ratio=1:3.22)

was added. To this slurry was then added 1800 grams of $Al_2(SO_4)_3.18H_2O$ and 2550 grams of $Ba(OH)_2.8H_2O$. After precipitation and coagulation was complete the pigment was filtered, washed and dried. The final pH of the dry pigment was 9.2.

Example II 3540 grams of lithopone were slurried in water and 92 cc. of sodium silicate solution added. The sodium silicate solution contained 35% solids and the $Na_2O:SiO_2$ ratio was 1:3.22. To the slurry was then added 212 grams of $Al_2(SO_4)_3$, $18 H_2O$ and 80 grams of NaOH. After the precipitation was complete the pigment was filtered, washed and dried. The final pH of the dry pigment was 7.7.

The pigment treated may be a white pigment such as lithopone, zinc sulfide, $TiO_2$, or so-called inert pigments, such as calcite, calcium and barium sulfates, asbestine, etc. or mixtures thereof. Treated pigments may be mixed with untreated pigments to produce a composite pigment of improved hiding power. A treated mixture of white and inert pigments has better covering than a mixture of separately treated white pigment and inert pigment, although each mixture has better covering than a mixture of the untreated pigments.

Soluble silicates other than sodium silicate may be used, such as potassium silicate. The amount of soluble silicate may vary, the amounts preferably being such that it contains between about 0.3% and about 10% of $SiO_2$ by weight of the pigment. Ordinarily less than 0.3% will not be used since the increase in hiding does not warrant the treatment. Within this range amounts which give smaller $SiO_2$ contents in the pigment are preferred, about 0.5% to about 10% $SiO_2$ by weight of the pigment being the most desirable. The actual amount used will, of course, depend somewhat upon the alkali metal oxide $SiO_2$ ratio, and upon the particular alkali metal present.

The soluble silicate is preferably added before the aluminum sulfate is added but the precipitant may be added first and the soluble silicate then added.

Having described the invention, what is claimed is:

1. The method of improving the hiding power of a pigment which comprises mixing the pigment in an aqueous slurry with an alkali metal silicate in which the ratio of alkali metal oxide to $SiO_2$ is less than 5:7 and precipitating the silicate by means of aluminum sulfate, the amount of $Al_2(SO_4)_3$ being in excess of that required to supply enough acid to satisfy the hydroxyl ions attributable to the alkali metal oxide of the alkali metal silicate, all in the presence of water.

2. The method of improving the hiding power of a pigment which comprises mixing the pigment in an aqueous slurry with an alkali metal silicate in which the ratio of alkali metal oxide to $SiO_2$ is less than 5:7 and precipitating the silicate by means of aluminum sulfate, the amount of $Al_2(SO_4)_3$ being three times that required to supply enough acid to satisfy the hydroxyl ions attributable to the alkali metal oxide in the soluble silicate, all in the presence of water.

3. The method of improving the hiding power of a pigment which comprises mixing the pigment in an aqueous slurry with a water soluble silicate, precipitating the silicate by means of aluminum sulfate, and mixing therewith a small amount of a water soluble substance selected from the class consisting of zinc and alkaline earth metal oxides, hydroxides and salts, and alkali metal oxides and hydroxides, in amounts sufficient to effect coagulation of the precipitate.

4. The method of improving the hiding power of a pigment which comprises mixing the pigment in an aqueous slurry with an alkali metal silicate in which the ratio of alkali metal oxide to $SiO_2$ is less than 5 to 7, and precipitating the silicate by means of aluminum sulfate, the amount of aluminum sulfate being in excess of that required to supply enough acid to satisfy the hydroxyl ions attributable to the alkali metal oxide of the alkali metal silicate, and adding a small amount of a water soluble substance selected from the class consisting of zinc, and alkaline earth metal oxides, hydroxides and salts, and alkali metal oxides and hydroxides in amounts sufficient to effect coagulation of the precipitate.

5. The method of claim 4 in which the amount of $Al_2(SO_4)_3$ is three times that required to supply enough acid to satisfy the hydroxyl ions attributable to the alkali metal oxide of the alkali metal silicate.

6. In the method of improving the hiding power of pigments by treatment of an aqueous slurry of the pigment containing a soluble silicate with aluminum sulfate to effect precipitation of the soluble silicate as aluminum silicate, the improvement which comprises adding a small amount of a water soluble substance selected from the class consisting of zinc and alkaline earth metal oxides, hydroxides and salts and alkaline metal oxides and hydroxides in amounts sufficient to effect coagulation of the precipitate.

7. The method of improving the hiding power of pigments which comprises forming an aqueous slurry of the pigment containing a water soluble silicate and adding aluminum sulfate and a water soluble substance selected from the class consisting of zinc and alkaline earth metal oxides, hydroxides and salts, and alkaline metal oxides and hydroxides, in amounts sufficient to precipitate the silicate in insoluble form and to effect coagulation of the precipitate.

8. The method of claim 7 in which the amount of aluminum silicate is sufficient to substantially completely precipitate the soluble silicate as aluminum silicate.

9. The method of improving the hiding power of pigments which comprises forming an aqueous slurry of the pigment containing a soluble silicate and adding aluminum sulfate and a water soluble substance selected from the class consisting of zinc and alkaline earth metal oxides, hydroxides and salts, and alkali metal oxides and hydroxides in amounts sufficient to precipitate the silicate in insoluble form and to effect coagulation of the precipitate, the aluminum sulfate also being in an amount in excess of that required to supply enough acid to satisfy the hydroxyl ions attributable to the alkali metal oxide of the alkali metal silicate, and the amount of the water soluble substance being sufficient to supply enough hydroxyl ions to satisfy the acidity due to the excess aluminum sulfate.

10. The method of improving the hiding power of a pigment which comprises forming an aqueous slurry of a pigment containing a water soluble silicate, precipitating the silicate by means of aluminum sulfate in an amount in excess of that required to supply enough acid to satisfy the hydroxyl ions attributable to the alkali metal oxide of the alkali metal silicate, and mixing therewith a water soluble substance selected from the class consisting of zinc and alkaline earth metal oxides, hydroxides and salt and alkali metal oxides and hydroxides in amount sufficient to effect coagulation of the precipitate and to supply enough hydroxl ions to satisfy the acidity due to the excess aluminum sulfate.

KENNETH S. MOWLDS.